(12) United States Patent
Lin

(10) Patent No.: US 7,762,515 B2
(45) Date of Patent: Jul. 27, 2010

(54) ADJUSTABLE SUPPORT APPARATUS APPLIED TO EQUIPMENT

(75) Inventor: Chun-Wang Lin, Taipei County (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 118 days.

(21) Appl. No.: 11/907,689

(22) Filed: Oct. 16, 2007

(65) Prior Publication Data

US 2008/0258024 A1     Oct. 23, 2008

(30) Foreign Application Priority Data

Apr. 18, 2007   (TW) ............................... 96113577 A

(51) Int. Cl.
*A47B 97/04* (2006.01)
(52) U.S. Cl. ...................... 248/447; 248/923; 248/133; 348/825
(58) Field of Classification Search ............... 248/441.1, 248/444, 447, 454, 457, 458, 132, 133, 136, 248/371, 372.1, 404, 157, 917, 206.5, 309.4, 248/295.11, 919, 922, 923, 918; 361/FOR. 104, 361/FOR. 105; 348/825, 827
See application file for complete search history.

(56) References Cited

U.S. PATENT DOCUMENTS

| 6,402,632 | B2 * | 6/2002 | Hope et al. ................... 473/218 |
| 7,594,630 | B2 * | 9/2009 | Ternus et al. .............. 248/206.5 |
| 7,637,226 | B1 * | 12/2009 | Bradley ...................... 116/28 R |
| 2005/0151043 | A1 * | 7/2005 | Kim et al. ................. 248/274.1 |

| 2008/0251678 | A1 * | 10/2008 | Lien et al. .................... 248/404 |

FOREIGN PATENT DOCUMENTS

| DE | 202005013312 U1 * | 12/2005 |
| FR |     2390615 A1    | 5/1977 |
| JP |    2004132410 A * | 4/2004 |
| KR |       100664323   | 12/2006 |
| KR |       664323 B1 * | 1/2007 |
| TW |       M282277    | 12/2005 |

OTHER PUBLICATIONS

DE 202005013312 to Chang, Publication Date Dec. 5, 2005, pp. 2.*
English language translation of abstract of TW M282277 (published Dec. 1, 2005).
English language translation of abstract of KR 100664323 (published Dec. 26, 2006).

* cited by examiner

*Primary Examiner*—A. Joseph Wujciak, III
(74) *Attorney, Agent, or Firm*—Thomas, Kayden, Horstemeyer & Risley

(57) ABSTRACT

The invention discloses an adjustable support apparatus for adjusting an object to a target position. The adjustable support apparatus comprises a metal member, a support member, and a magnetic member. The metal member has an inner space. The support member has a first end and a second end, and is movably disposed in the inner space of the metal member through the first end. The object is attached on the second end. The magnetic member is disposed on the support member and is adjacent to the first end. A magnetic force exists between the magnetic member and the metal member. When an external force capable of overcoming the magnetic force is applied on the object or the support member, the support member moves with respect to the metal member; and when the external force disappears, the magnetic force makes the support member stay at the target position statically.

4 Claims, 6 Drawing Sheets

ADJUSTABLE SUPPORT APPARATUS APPLIED TO EQUIPMENT

BACKGROUND OF THE INVENTION

1. Field of the Invention

The invention relates to a support apparatus, and particularly, to an adjustable support apparatus.

2. Description of the Prior Art

At present, the most common supporting way for support apparatus is to fix directly an object. In other words, unless the object is re-fixed, the relative position of the object remains unchanged. An improved way is to use a support apparatus with adjustable length to reach the function of adjusting the relative position of the object, and use the positioning apparatus (e.g., screw) to adjust the length of the support apparatus. However, not only it is inconvenient to operate the support apparatus, it is also uneasy to adjust accurately the support apparatus to the expected position. Another way of improvement is to fix the object on the constant force spring of the support apparatus. Herewith the object can reach an adjustable fix via a deformation demand on the constant force spring. However, the price of the constant force spring is more expensive than the general spring and its volume is too large. Thus, it is unfavorable for the development of the product. If a general spring is directly used for suspending or supporting the weight of the object, then when the position of the object is adjusted, the spring would bounce back. Thus, a tenon or other positioning apparatus is needed to overcome the bouncing back. However, it is inconvenient to operate the support apparatus and the commercialization of such a support apparatus is not easy.

Therefore, the scope of the invention is to provide an adjustable support apparatus to solve the above problems.

SUMMARY OF THE INVENTION

A scope of the invention is to provide an adjustable support apparatus to smoothly adjust an object to a target position.

According to a preferred embodiment, the adjustable support apparatus of the invention comprises a metal member, a support member, and a magnetic member. The metal member has an inner space. The support member has a first end and a second end, and is movably disposed into the inner space of the metal member through the first end. The magnetic member is disposed on the support member and is adjacent to the first end. A magnetic force exists between the magnetic member and the metal member. When an external force capable of overcoming the magnetic force is applied on the object or the support member, the support member moves with respect to the metal member. When the external force disappears, the magnetic force keeps the support member stay at the target position statically.

According to another preferred embodiment, the equipment of the invention comprises a base, an object, and an adjustable support apparatus. The adjustable support apparatus comprises a metal member, a support member, and a magnetic member. The metal member, pivotally connected onto the base, has an inner space. The support member, having a first end and a second end, is movably disposed into the inner space of the metal member through the first end, the object being disposed on the second end of the support member. The magnetic member disposed on the support member is adjacent to the first end, and, a magnetic force exists between the magnetic member and the metal member. When an external force capable of overcoming the magnetic force is applied on the object or the support member, the support member moves with respect to the metal member. When the external force disappears, the magnetic force keeps the support member stay at the target position statically. In this way, a user can smoothly adjust the object disposed on the equipment to the target position.

Therefore, the adjustable support apparatus according to the invention is to place the support member at a target position statically by using the magnetic member and the metal member. The function of smoothly adjusting the object to the target position can be reached.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
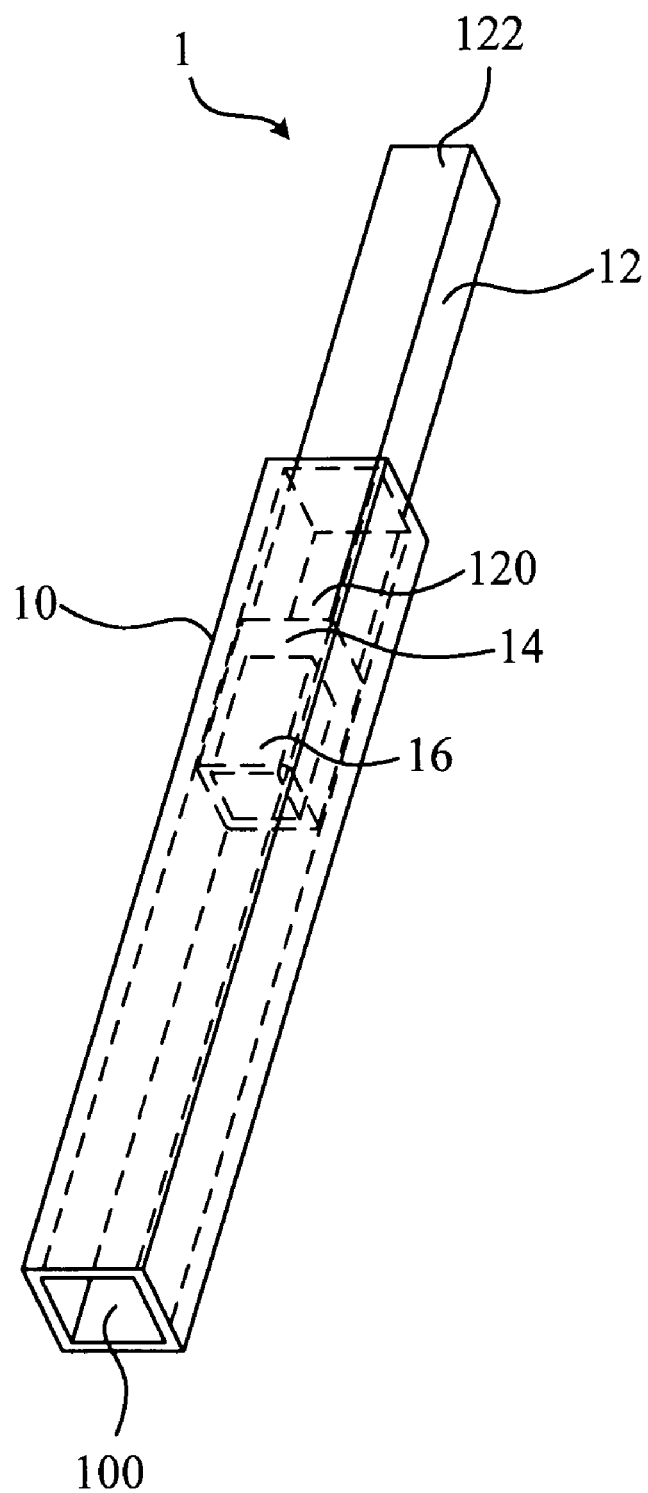
FIG. 1 is a perspective view of the adjustable support apparatus in the first preferred embodiment according to the invention.
Figure 2A:
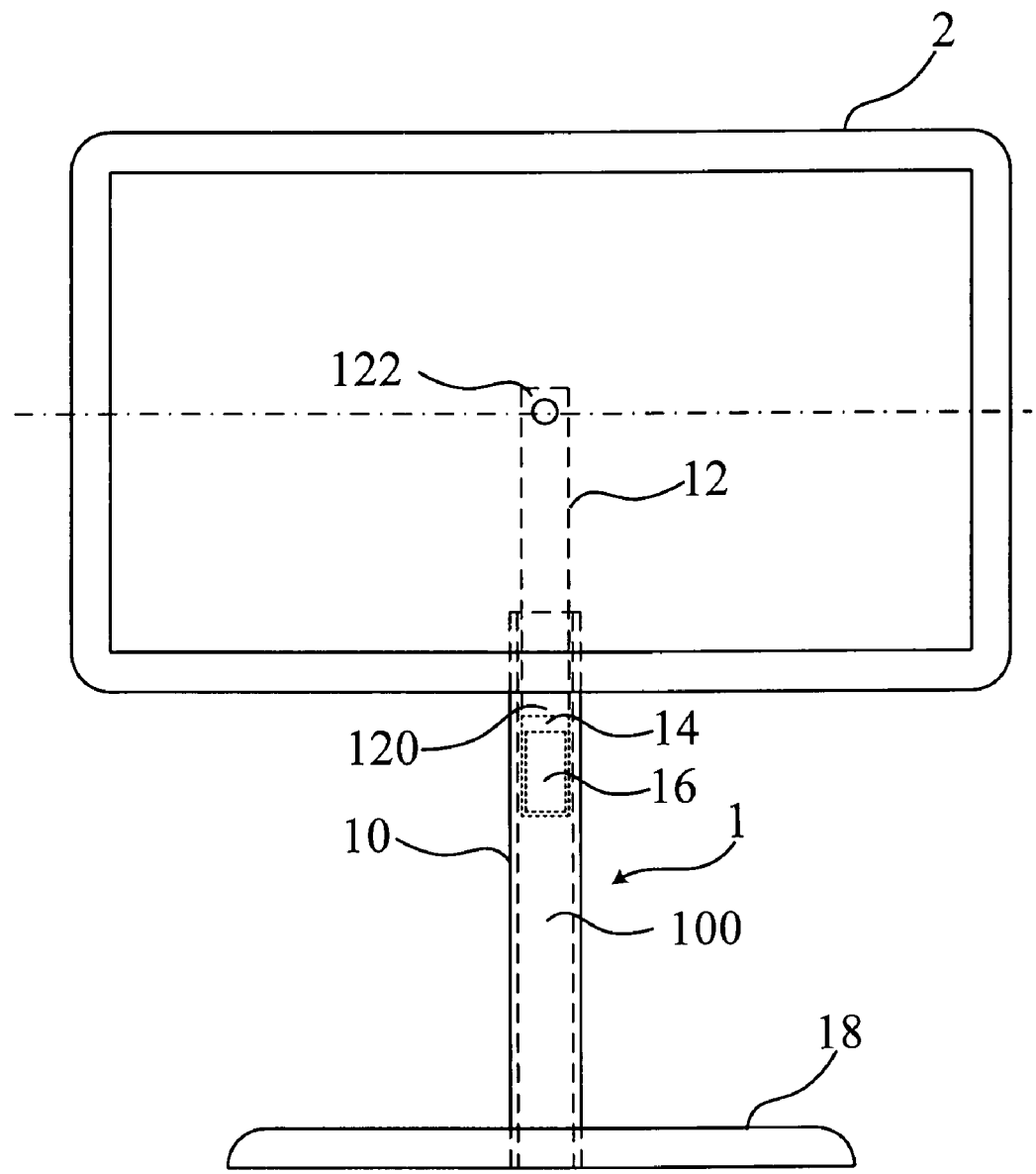
FIG. 2A and FIG. 2B are diagrams of the object disposed on the support apparatus in FIG. 1.
Figure 2B:
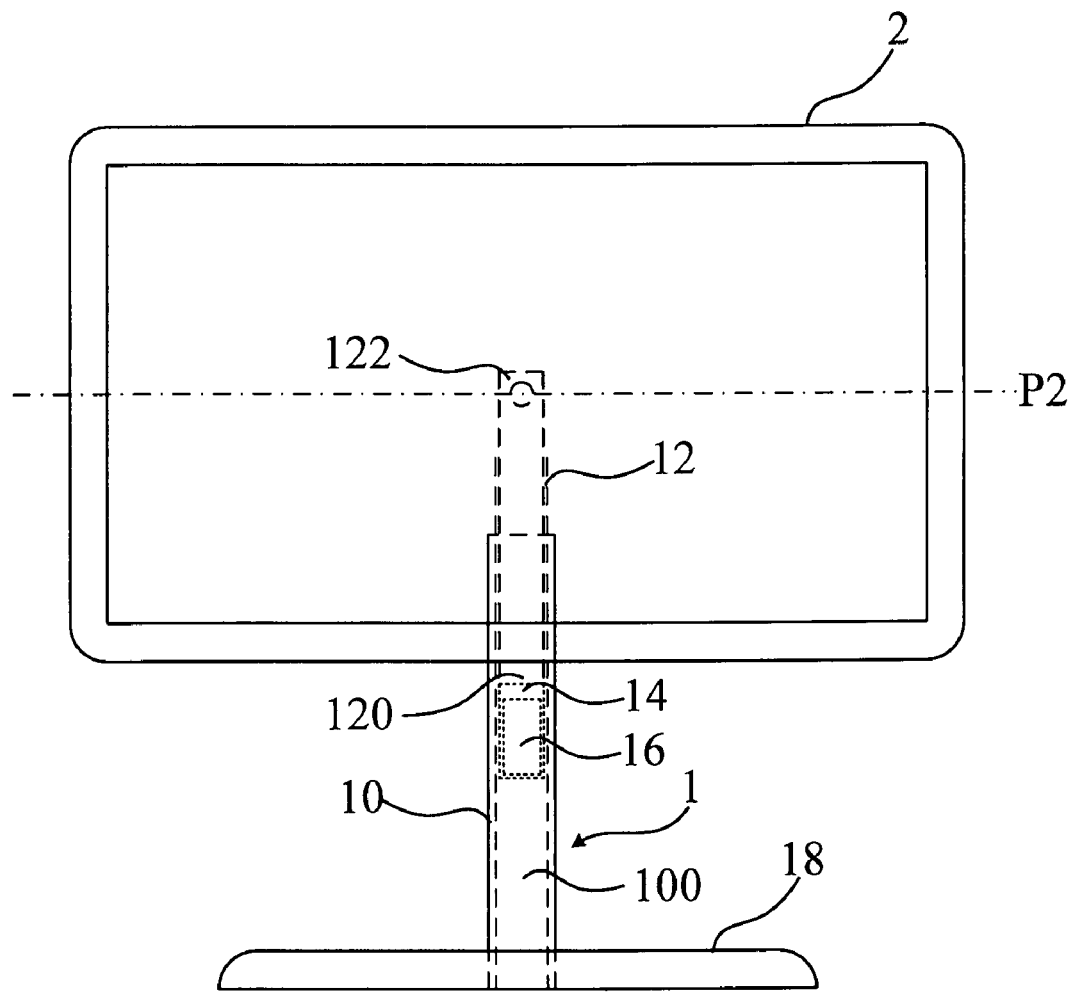

Please refer to FIG. 1, FIG. 2A, and FIG. 2B. FIG. 1 is a perspective view of the adjustable support apparatus 1, according to a preferred embodiment of the invention. FIG. 2A and FIG. 2B show a diagram of an object 2 disposed on the support apparatus 1 in FIG. 1. In the embodiment, the adjustable support apparatus 1 of the invention is used for adjusting the object 2 from a present position P1 (as shown in FIG. 2A) to a target position P2 (as shown in FIG. 2B). As shown in FIG. 1 and FIG. 2, the adjustable support apparatus 1 comprises a metal member 10, a support member 12, a holder 14, a magnetic member 16, and a base 18.

The metal member 10 is pivotally connected onto the base 18, and has an inner space 100. The support member 12, with its first end 120 and second end 122, is movably disposed into the inner space 100 of the metal member 10 through the first end 120. The object 2 is disposed on the second end 122 of the support member 12. In the embodiment, the object 2 is a monitor. In practical applications, the object 2 can be a monitor, a television, a drip stand, a drawer, a fanner, a car hood, or other similar object.

The holder 14 is disposed on the support member 12 and is close to the first end 120. The magnetic member 16 is disposed in the holder 14. By doing that, a magnetic force exists between the magnetic member 16 and the metal member 10 to keep the object 2 or the support member 12 stay in any position statically. In the embodiment, the holder 14 is made of plastic, but it is not limited to that. It should be noticed that the effect of the holder 14 is to reduce the friction between the support member 12 and the metal member 10. In practical applications, the magnetic member 16 can be directly disposed on the support member 12 instead of the holder 14.

As shown in FIG. 2A and FIG. 2B, when an external force capable of overcoming the magnetic force is applied on the object 2 or the support member 12, the object 2, following the support member 12, will move from the present position P1 (as shown in FIG. 2A) to the target position P2 (as shown in FIG. 2B) with respect to the metal member 10. When the external force disappears, the magnetic force exists between the magnetic member 16 and the metal member 10 will keep the support member 12 stay at the target position P2 statically (as shown in FIG. 2B).

Figure 3:
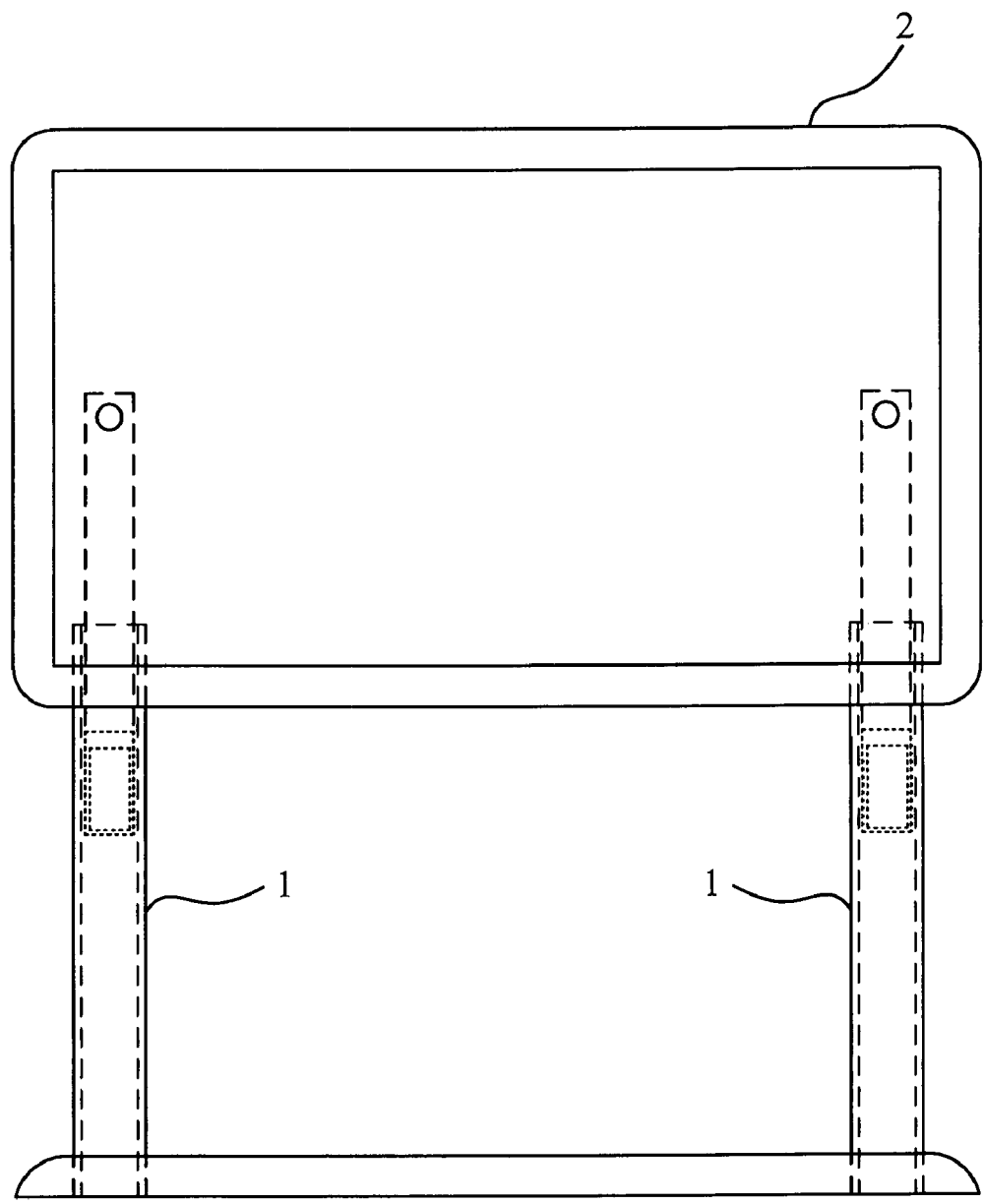
FIG. 3 is a diagram of the object disposed on two support apparatuses in another preferred embodiment of the invention.

Please refer to FIG. 3. FIG. 3 is a diagram of the object 2 disposed on two sets of support apparatus 1 of another preferred embodiment of the invention. In the embodiment, because the object 2 is disposed on two sets of support apparatus 1, both the stability and the supporting force can be increased.

Figure 4A:
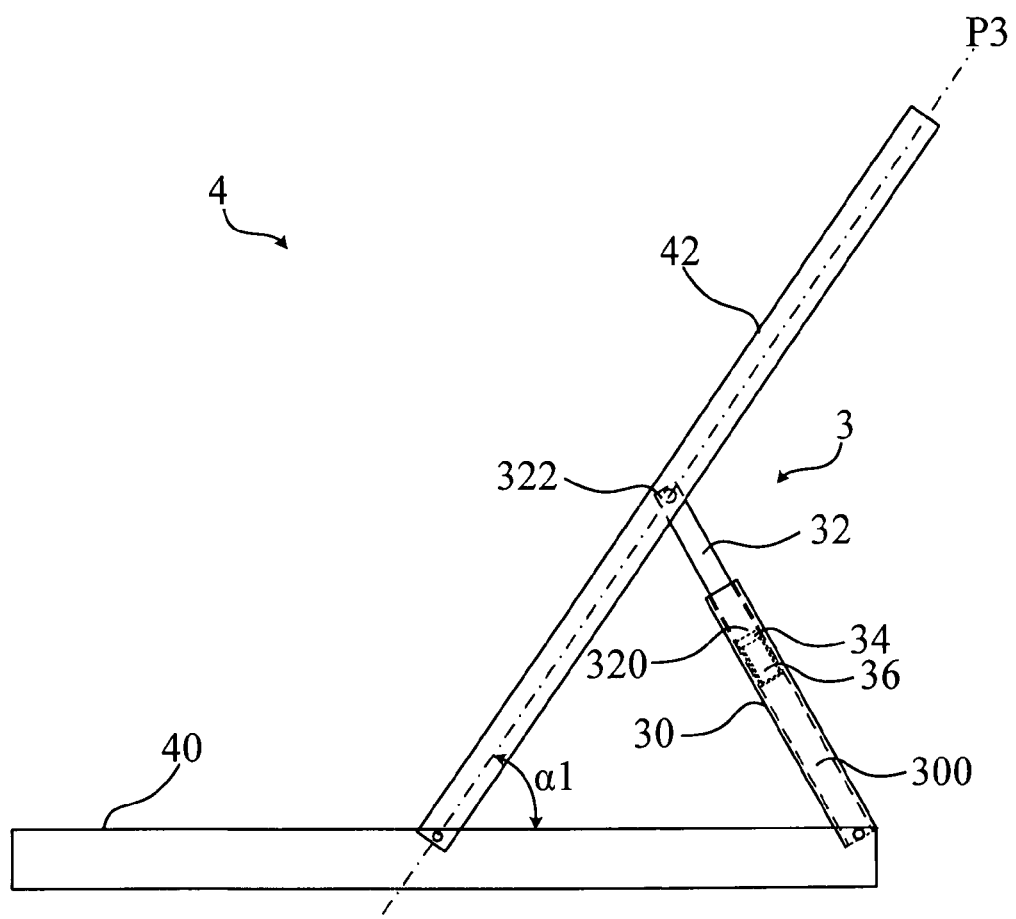
FIG. 4A and FIG. 4B show a side view of the equipment in another preferred embodiment of the invention.
Figure 4B:
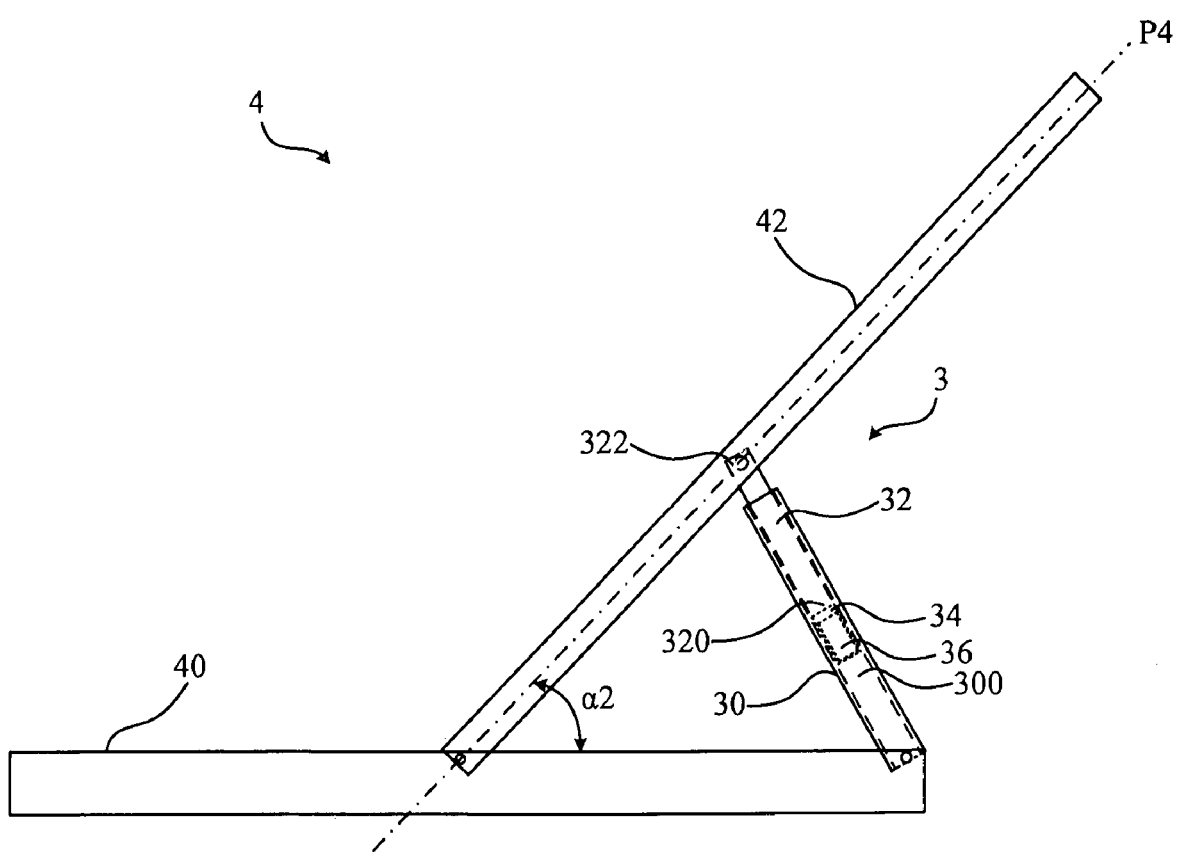

Please refer to FIG. 4A and FIG. 4B. FIG. 4A and FIG. 4B are side view of the equipment 4 of another preferred embodiment of the invention. In the embodiment, the equipment 4 is a tablet computer. As shown in FIG. 4A and FIG. 4B, the equipment 4 comprises a base 40, an object 42, and an adjustable support apparatus 3. The adjustable support apparatus 3 is used for adjusting the object 42 from the present position P3 (as shown in FIG. 4A) to the target position P4 (as shown in FIG. 4B). The adjustable support apparatus 3 comprises a metal member 30, a support member 32, a holder 34, and a magnetic member 36.

The metal member 30 is pivotally connected onto the base 40, and has an inner space 300. The support member 32 has a first end 320 and a second end 322. The support member 32 is movably disposed into the inner space 300 of the metal member 30 through the first end 320. The object 42 is disposed on the second end 322 of the support member 32. In the embodiment, the base 40 is a base of the tablet computer, and the object 42 is a monitor of the tablet computer.

The holder 34 is disposed on the support member 32 and is close to the first end 320. The magnetic member 36 is disposed in the holder 34. By doing that, a magnetic force exists between the magnetic member 36 and the metal member 30. In the embodiment, the holder 34 is made of plastic, but it is not limited to that. It should be noticed that the function of the holder 34 is to reduce the friction between the support member 32 and the metal member 30. In practical applications, the magnetic member 36 can be directly disposed on the support member 32 instead of the holder 34.

As shown in FIG. 4A and FIG. 4B, when an external force capable of overcoming the magnetic force is applied on the object 42 or the support member 32, the object 42, following the support member 32, will move from the present position P3 (as shown in FIG. 4A) to the target position P4 (as shown in FIG. 4B) with respect to the metal member 30. When the external force disappears, the magnetic force exists between the magnetic member 36 and the metal member 30, and it will keep the support member 32 stay at the target position P4 statically (as shown in FIG. 4B). In the embodiment, the object 42 is pivotally connected onto the base 40. When the support member 32 moves from the present position P3 to the target position P4 with respect to the metal member 30, the object 42 will rotate with respect to the base 40 (rotating from the angle α1 in FIG. 4A to the angle α2 in FIG. 4B). By doing that, a user could uses the adjustable apparatus 3 of the invention to adjust the position of the object 42, because the metal member 30 and the object 42 are pivotally connected onto the base 40 respectively, the object 42 can rotate with respect to the base 40 and further adjusts the angle of the object 42.

Compared to the prior art, the adjustable support apparatus of the invention uses the magnetic force between the magnetic member and the metal member to keep the support member stay at the target position and further reaches the function of adjusting the object to the target position. Besides, the adjustable support apparatus of the invention can use the minimum devices to reach the function of adjusting the object to the target position. It reduces the cost of the related product and the operation can be easily used to facilitate the development and the use of the related product.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An equipment, comprising:
   a base;
   a television;
   an adjustable support apparatus for adjusting the television to a target position, comprising:
   a tubular metal member, disposed on the base, with an inner space;
   a tubular support member, with a first end and a second end, being telescopic slidable disposed into the inner space of the metal member through the first end, the television being disposed on the second end of the support member; and
   a magnetic member, disposed on the support member, being adjacent to the first end, a magnetic force existing between the magnetic member and the metal member;
   wherein when an external force capable of overcoming the magnetic force is applied to the television or the support member, the support member moves with respect to the metal member, and when the external force disappears, the magnetic force keeps the support member at the target position statically, the television is pivotally connected onto the base such that, when the support member is being slidable in varying height with respect to the metal member, the television is rotatable with respect to the base.

2. The equipment of claim 1, wherein the magnetic member is a magnet.

3. The equipment of claim 1, wherein the adjustable support apparatus further comprises a holder disposed on the support member, and the magnetic member is disposed in the holder.

4. The equipment of claim 3, wherein the holder is made of plastic.

* * * * *